3,819,810
PHOSPHORIC ACID PURIFICATION
David Goldstein, East Brunswick, N.J., assignor to FMC Corporation, New York, N.Y.
Continuation-in-part of abandoned application Ser. No. 108,920, Jan. 22, 1971. This application June 19, 1972, Ser. No. 264,177
Int. Cl. C01b 25/16
U.S. Cl. 423—321     4 Claims

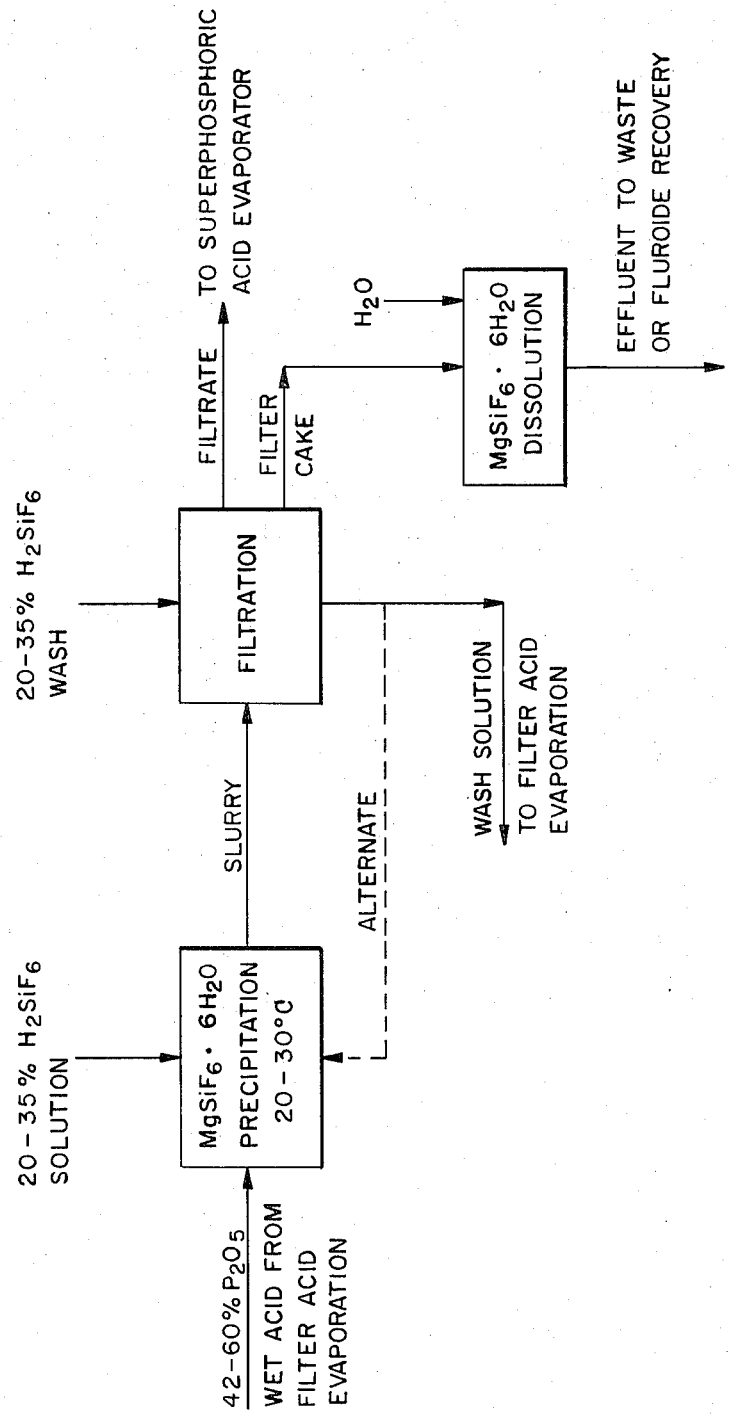

ABSTRACT OF THE DISCLOSURE

Wet acid is freed of substantial magnesium impurities by contacting the acid with a soluble hexafluorosilicate ($SiF_6^{-2}$) thereby forming a precipitate of hydrated magnesium hexafluorosilicate ($MgSiF_6 \cdot 6H_2O$) which is then removed, leaving the purified acid.

CROSS-REFERENCE TO RELATED APPLICATIONS

This application is a continuation-in-part of Ser. No. 108,920, filed Jan. 22, 1971, now abandoned.

This invention relates to the purification of phosphoric acid produced by the wet process. The invention is particularly concerned with the removal of metal contaminants from such acid.

The manufacture of phosphoric acid by the so-called "wet process" has been practiced for many years in the chemical industry. In this process, crushed phosphate rock is acidified with sulfuric acid thereby releasing the phosphoric acid. The reaction is generally regarded as proceeding according to the following equation assuming the phosphate rock is fluoroapatite:

$$Ca_{10}(PO_4)_6F_2 + 10H_2SO_4 + 10nH_2O \rightarrow 6H_3PO_4 + 10CaSO_4 \cdot nH_2O + 2HF$$

where $n$ is 0.5 to 2.0. The calcium sulfate is separated, usually by filtration, and the aqueous acid which assays at about 30% $P_2O_5$ and known in the trade as filter acid, concentrated to the desired strength. Merchant acid, having a $P_2O_5$ content of 52–54% is normally produced. Another important product made from wet acid is superphosphoric acid where further evaporation is carried out to a total $P_2O_5$ content of 70–72% to give a product containing substantial amounts of pyro and other condensed polyphosphoric acids.

In actual practice, however, the fluoroapatite phosphate ore contains other mineral substances such as certain metal oxide assays e.g. MgO, CaO, $Fe_2O_3$ and $Al_2O_3$ and these find their way into the crude wet acid product thereby rendering it unsuitable for many applications. For instance, the presence of MgO in excess of about 0.5% in a superphosphoric acid containing 70–72% $P_2O_5$ is especially objectionable due to the precipitation of magnesium pyrophosphate during the manufacture of liquid ammonium polyphosphate fertilizers, an important use of superphosphoric acid. As a consequence further refining is necessary to produce a satisfactory wet acid and numerous purification schemes have been suggested and put into practice over the years. Generally speaking, these fall into two categories, (1) extraction of the phosphoric acid with a solvent or (2) removal of dissolved metals from the crude aqueous wet acid.

In the extraction procedure (1) the wet acid is treated with an organic liquid such as an alkyl phosphate, aryl phosphate, alkyl aryl phosphate, ether, amine, alcohol or the like, and the resulting extract shaken with water which removes the phosphoric acid from the solvent. The aqueous solution of phosphoric acid is then concentrated to the desired strength.

Procedures falling in the second category involve treating the crude wet acid directly for the purpose of removing the metal contaminants. In this approach, various flocculating or precipitating agents are employed capable of yielding insoluble compounds of the metal impurities and these are then removed usually by filtration and the resulting demetalized acid then concentrated to the desired strength.

An illustration of type 2 purification, to which the present invention pertains, is disclosed in U.S. 3,379,501 to Treitler et al. and involves adjusting the calcium ion level of 10–30% $P_2O_5$ wet acid between 0.25 and 3% (as CaO) followed by the addition of hydrofluoric acid which reacts with the impurities and precipitates out the metal insolubles.

When the wet process is carried out using phosphate ore from the North Carolina deposits with their abnormally high magnesium content, the resulting wet acid presents an especially severe purification problem.

It has now been discovered that magnesium impurities in wet process phosphoric acid having an $MgO/P_2O_5$ weight ratio from about 0.007 to about 0.03 and having a $P_2O_5$ assay from about 42% to about 60% can be substantially reduced by treating the acid with hexafluorosilicic acid or other soluble hexafluorosilicates thereby forming a precipitate of hydrated magnesium hexafluorosilicate ($MgSiF_6 \cdot 6H_2O$) which is then removed leaving the purified acid. The treatment is carried out at a temperature range from about 20° C. to about 30° C. while the amount of soluble fluorosilicate added is such that the weight ratio of $Si:P_2O_5$ in the reaction solution is at least 0.003:1 and the weight ratio of $F:P_2O_5$ is at least 0.03:1. An important and unique advantage of the invention is its utilization of hexafluorosilicic acid which can be produced as a by-product of the wet process.

In accordance with the present invention, crude wet acid is mixed with hexafluorosilicic acid whereby magnesium hexafluorosilicate ($MgSiF_6 \cdot 6H_2O$) precipitates out in the form of a slurry which is easily separated from the acid and the latter then concentrated in the known manner. One manner of carrying out the processs is shown in the flow sheet diagram of the single figure drawing. As can be seen from the diagram, filtration is employed to remove the $MgSiF_6 \cdot 6H_2O$ which, after washing, is then transported to a waste station or employed as a source of fluoride recovery. Washing is done by hexafluorosilicic acid or other soluble hexafluorosilicate since the

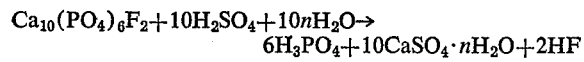

$$MgSiF_6 \cdot 6H_2O$$

is highly soluble in water but relatively insoluble in the above solutions. Such washing reduces $P_2O_5$ losses in the filter cake which contains the wet acid. The wash solution can be used for further Mg precipitation or can be recycled back to the wet filter acid (before evaporation) in the wet acid plant. The filtrate is concentrated to give superphosphoric acid. Since the solubility of $MgSiF_6 \cdot 6H_2O$ increases with temperature, it is preferred to carry out the reaction at the lowest practice temperature; namely ambient temperatures in the range of 20–30° C. and most often at about 25° C. At higher temperatures, $MgSiF_6 \cdot 6H_2O$ solubility increases, creating post-precipitation problems if the filtrate cools after solids separation. Lower temperatures may be employed although the slurry may become viscous and present filtration difficulties.

The process of the invention performs satisfactorily with acids whose $P_2O_5$ content has been adjusted from about 42% to about 60% although optimum magnesium removal is best effectuated with merchant grade acid, that is acid having $P_2O_5$ content of 52–54%. At the lower range of $P_2O_5$, post-precipitation tends to occur in the final filtrate; at the higher range, fluorine containing vapors tend to be formed.

In order to avoid excessive dilution of the wet acid feed and wash liquor, it is preferable to use the highest possible concentration of $H_2SiF_6$. The acid is readily available commercially in concentrations of 28–30% and should be used as such since excessive dilution may cause increased solubility of $MgSiF_6 \cdot 6H_2O$ and consequent incomplete removal of the magnesium contamination. Also, additional evaporation will be required because of the excess of dilution in fluorosilicic acid.

The amount of $H_2SiF_6$ used will vary with the particular source of a set acid since it will have varying quantities of magnesium and other impurities such as iron and aluminum. The overall amount of $H_2SiF_6$ is 4–6 lbs./lb. of MgO in the wet acid. As already pointed out, the North Carolina phosphate rock is relatively rich in magnesium content and as a consequence wet acid derived therefrom will exhibit a high concentration of magnesium values. As a general rule, a silicon concentration by weight of at least 0.003:1 expressed as $Si:P_2O_5$ and a fluorine concentration by weight of at least 0.03:1 expressed as $F:P_2O_5$ in the reaction solution is required to initiate precipitation. With an acid of 53% $P_2O_5$, 60% of the magnesium, 25% of the iron and 10% of the aluminum is removed using a total $H_2SiF_6$, on a 100% basis, of about 0.04 parts per part of 53% $P_2O_5$ acid (by weight). Removal of still more of the metallic constituents requires greater quantities of the $H_2SiF_6$. Those skilled in the art will use that quantity of $H_2SiF_6$ needed to remove the metallic impurities down to the desired percentage to meet their needs.

The reaction of $H_2SiF_6$ with wet acid is very rapid and is about 90% complete in 5 minutes and equilibrium is reached after approximately 25 minutes.

As above pointed out, $H_2SiF_6$ is an article of commerce which can be purchased on the chemical market. However, it is readily produced by condensing hydrogen fluoride and silicon tetrafluoride which are by-products of the wet process. One method of recovery of fluorine values from the wet process in the form of $H_2SiF_6$ is known as the Parrish process and is described in U.S. Pat. No. 3,091,513. Another source of soluble $(SiF_6^{-2})$ is ammonium hexafluorosilicate.

The present invention thus provides a means for removing impurities from wet acid and at the same time utilizes as the purification agent, $H_2SiF_6$, which can be produced as a by-product during the acidification of the phosphate ore.

Reference is now made to the non-limiting examples which were carried out using the following procedures.

In the examples all tests were made in a 600 ml. beaker. Moderate agitation was supplied with a motor-driven Teflon paddle impeller. The duration of all reactions was 30 minutes. Final slurry filtrations were made through a 7 cm., diameter Büchner funnel with polypropylene filter cloth into a vacuum flask. A high vacuum mechanical pump was used for suction. After filtering the Büchner funnel was emptied of its contents. When washing, the $H_2SiF_6$ was poured over the filter cake and vacuum filtered into the Büchner funnel. All streams were weighed and analyzed for MgO, $P_2O_5$, Si and F. Selected filtrates were also analyzed for Fe and Al.

A nominal 30% $S_2SiF_6$ solution analyzing 23.96% F and 5.20% Si, was used in all runs. The wet acid was commercial North Carolina acid, containing 53.14% $P_2O_5$. When testing other concentrations of $P_2O_5$, this acid was either concentrated by evaporation or diluted water. Analyses of five acid concentrations used in the examples are given in Table I below.

TABLE I

| Constituent (percent by wt.) | A | B | C | D | E |
|---|---|---|---|---|---|
| $P_2O_5$ | 53.14 | 60.18 | 45.0 | 40.0 | 69.38 |
| MgO | 0.81 | 1.06 | 0.69 | 0.61 | 1.08 |
| Si | 0.037 | 0.025 | 0.031 | 0.028 | 0.027 |
| F | 0.53 | 0.36 | 0.45 | 0.40 | 0.22 |
| $SO_4$ | 2.89 | 3.27 | 2.45 | 2.18 | 3.72 |
| Fe | 1.00 | 1.13 | 0.85 | 0.75 | 1.29 |
| Ca | 0.0053 | 0.006 | 0.0045 | 0.004 | 0.0068 |
| Al | 0.30 | 0.34 | 0.25 | 0.23 | 0.39 |

(1) Effect of Feed Acid $P_2O_5$ Concentration

This is provided by the examples summarized in Table II. Examples 1–7 represent runs in which optimum results were obtained between starting acid concentrations of 45–60% $P_2O_5$. With a 40% $P_2O_5$ acid, no precipitation occurred (Example 8). With a 68% $P_2O_5$ acid, no precipitation occurred and fluoride containing gases were evolved caused by the diminished solubility of $H_2SiF_6$ in concentrated $H_3PO_4$. The evolved gases were probably HF and/or $SiF_4$ (Example 9).

(2) Fe and Al Removal

Analyses of the filtrates in Examples 1–5 were made for Fe and Al, shown in Table III. Fe and Al were removed to the extent of about 25% and 10% of the amounts present in the feed acid, respectively.

(3) Filtration Rate

Time of filtration of the end slurry was determined. In Examples 1–7, the filtration rate was rapid and was equivalent to about 150 gal. of slurry/hour-sq. ft. of filter area.

EXAMPLE 10

(4) Effect of Temperature

A test was run in which conditions were the same as in Example 1, except that the reaction was conducted at 50° C. instead of at ambient temperature. After filtration a considerable amount of post-precipitation occurred in the filtrate, requiring another filtration at *ambient temperature*. Overall, the same amount of MgO was removed as in Example 1. It is preferred to run at ambient temperature, however, to avoid the post-precipitation problem which could result in blinding of filter media and possible re-filtration to remove the post-precipitate.

EXAMPLE 11

(5) Rate of Reaction

Reaction conditions were the same as in Example 5. Slurry samples, 20 ml. each, were taken every 5 minutes and filtered. The filtrates were analyzed with the following results:

| Time of reaction (min.): | Filtrate analyses (percent MgO) |
|---|---|
| 5 | 0.33 |
| 10 | 0.32 |
| 15 | 0.30 |
| 20 | 0.30 |
| 25 | 0.28 |
| 30 | 0.28 |

The data shows that the reaction is very rapid with about 90% of the reaction complete in 5 minutes. Equilibrium is reached in about 25 minutes.

TABLE II.—EFFECT OF FEED ACID CONCENTRATION
(Examples 1–9)

| | Acid used | | Temp., °C. | Wt. of 30% H₂SiF₆, gms. | Filter cake wash | | Constituent | Analyses (percent by wt.) | | | Percent | |
|---|---|---|---|---|---|---|---|---|---|---|---|---|
| | Type | Wt., gms. | | | Gms. of 30% H₂SiF₆ | Displacement washes | | Filtrate | Residue | Wash liquor | P₂O₅ loss in residue* | MgO in 72% acid** |
| Example number: | | | | | | | | | | | | |
| 1 | A | 300 | 25–29 | 43.0 | None | | P₂O₅<br>MgO<br>Si<br>F | 48.69<br>0.25<br>0.18<br>1.51 | 19.18<br>5.15<br>5.04<br>27.38 | | 2.8 | 0.37 |
| 2 | A | 300 | 26–30 | 37.6 | None | | P₂O₅<br>MgO<br>Si<br>F | 48.68<br>0.30<br>0.16<br>1.45 | 19.09<br>5.20<br>4.80<br>25.73 | | 2.5 | 0.44 |
| 3 | A | 300 | 23–27 | 43.0 | 30 | 3 | P₂O₅<br>MgO<br>Si<br>F | 49.05<br>0.23<br>0.18<br>1.43 | 7.64<br>5.32<br>6.74<br>27.8 | 11.79<br>0.033<br>1.39<br>6.85 | 0.74 | 0.34 |
| 4 | A | 300 | 23–27 | 43 | 60 | 6 | P₂O₅<br>MgO<br>Si<br>F | 49.07<br>0.23<br>0.18<br>1.44 | 1.98<br>5.10<br>7.20<br>33.46 | 9.42<br>0.061<br>4.9<br>19.95 | 0.26 | 0.34 |
| 5 | A | 300 | 27–29 | 38.0 | 15 | 1.5 | P₂O₅<br>MgO<br>Si<br>F | 48.67<br>0.30<br>0.18<br>1.54 | 6.03<br>4.49<br>5.93<br>26.1 | 32.61<br>0.07<br>1.82<br>9.05 | 1.0 | 0.44 |
| 6 | B | 266 | 24–31 | 43.0 | None | | P₂O₅<br>MgO<br>Si<br>F | 54.03<br>0.27<br>0.19<br>1.47 | 23.78<br>6.15<br>4.37<br>23.78 | | 3.6 | 0.36 |
| 7 | C | 354 | 25 | 43.0 | None | | P₂O₅<br>MgO<br>Si<br>F | 42.12<br>0.30<br>0.46<br>2.13 | 11.4<br>4.66<br>4.37<br>20.8 | | 1.2 | 0.51 |
| 8 | D | 398 | 25 | 43.0 | | | No precipitate obtained | | | | | |
| 9 | E | 300 | 50–60 | 43.0 | | | No precipitate formed—heavy foaming and fumes | | | | | |

*Based on P₂O₅ in wet acid feed.
**Calculated.

TABLE III.—Fe AND Al ANALYSES FOR FILTRATES IN EXAMPLES 1–5

| | Fe* | Al* | Fe in 72% acid** | Al in 72% acid** |
|---|---|---|---|---|
| Example number: | | | | |
| 1 | 0.63 | 0.24 | 0.93 | 0.36 |
| 2 | 0.71 | 0.25 | 1.05 | 0.37 |
| 3 | 0.65 | 0.25 | 0.95 | 0.37 |
| 4 | 0.62 | 0.25 | 0.91 | 0.37 |
| 5 | 0.68 | 0.25 | 1.01 | 0.37 |

*Without the H₂SiF₆ treatment, Fe would be about 0.9% and Al 0.27–0.28% in these solutions.
**Calculated values.

Note.—All values are percent by weight.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A method of removing magnesium impurities from wet process phosphoric acid having an MgO/P₂O₅ weight ratio from about 0.007 to about 0.03 and having a P₂O₅ assay of from about 42% to about 60% comprising (1) treating the acid with a soluble hexafluorosilicate ($SiF_6^{-2}$) in an amount such that the weight ratio of Si:P₂O₅ in the reaction solution is at least 0.003:1 and the weight ratio of F:P₂O₅ is at least 0.03:1 in the temperature range of 20–30° C. whereby magnesium hexafluorosilicate is precipitated and (2) separating the magnesium fluorosilicate from the purified acid.

2. The method according to claim 1 wherein the acid is merchant grade acid having a P₂O₅ assay of 52–54%.

3. The method according to claim 1 wherein the soluble hexafluorosilicate is hexafluorosilicic acid.

4. The method according to claim 1 wherein the hexafluorosilicic acid is in the form of about 30% aqueous solution.

References Cited
UNITED STATES PATENTS 3,141,734   7/1964   Ittlinger _____ 423—321
3,206,282   9/1965   Crawford et al. _____ 423—321

OSCAR R. VERTIZ, Primary Examiner
G. A. HELLER, Assistant Examiner

US. Cl. X.R.
423—331; 472

UNITED STATES PATENT OFFICE
CERTIFICATE OF CORRECTION

Patent No. 3,819,810     Dated June 25, 1974

Inventor(s) David Goldstein

It is certified that error appears in the above-identified patent and that said Letters Patent are hereby corrected as shown below:

Column 2, line 62, "practice" should read --practical--.

Column 3, line 68, "$S_2SiF_6$" should read --$H_2SiF_6$--.

Column 6, Table II, "MgO in 72% Acid" should read --% MgO in 72% Acid--.

Signed and sealed this 24th day of June 1975.

(SEAL)
Attest:

RUTH C. MASON
Attesting Officer

C. MARSHALL DANN
Commissioner of Patents
and Trademarks